US008429691B2

(12) United States Patent
Jensen

(10) Patent No.: US 8,429,691 B2
(45) Date of Patent: Apr. 23, 2013

(54) COMPUTATIONAL RECOMMENDATION ENGINE

(75) Inventor: Paul G. Jensen, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 906 days.

(21) Appl. No.: 12/244,731

(22) Filed: Oct. 2, 2008

(65) Prior Publication Data

US 2010/0088727 A1 Apr. 8, 2010

(51) Int. Cl.
*H04N 5/445* (2011.01)

(52) U.S. Cl.
USPC ........ 725/46; 725/9; 725/14; 725/15; 725/16; 725/17; 725/18; 725/19; 725/20; 725/21; 725/44

(58) Field of Classification Search .......... 725/9, 14–21, 725/44, 46
See application file for complete search history.

(56) References Cited

U.S. PATENT DOCUMENTS

| 7,284,202 | B1 | 10/2007 | Zenith |
| 2002/0129361 | A1* | 9/2002 | Arita et al. ........... 725/23 |
| 2003/0131355 | A1 | 7/2003 | Berenson et al. |
| 2005/0210520 | A1 | 9/2005 | Horvitz et al. |
| 2006/0143236 | A1 | 6/2006 | Wu |
| 2006/0150216 | A1* | 7/2006 | Herz et al. ........... 725/50 |
| 2007/0073704 | A1 | 3/2007 | Bowden et al. |
| 2007/0079333 | A1* | 4/2007 | Murakami et al. ...... 725/46 |
| 2007/0186243 | A1* | 8/2007 | Pettit et al. ........... 725/46 |
| 2007/0250861 | A1 | 10/2007 | Angiolillo et al. |
| 2008/0178239 | A1 | 7/2008 | Yampanis |

FOREIGN PATENT DOCUMENTS

| WO | 0010327 A1 | 2/2000 |
| WO | 0124524 A1 | 4/2001 |
| WO | WO 0125947 A1 * | 4/2001 |

OTHER PUBLICATIONS

Vasconcelos, et al, "Ethnographic Investigational Methodology and Evaluation on Local Television Channel Creation that Allows Interaction with the Community", Retrieved at <<http://www.cs.tut.fi/~lartur/euroitv07_ajp/WIP16.htm>>, Piotr Gołębiowski, Aug. 4, 2008, pp. 4.

"Estimating the Interdependence of Television Program Viewership between Spouses: a Bayesian Simultaneous Equation Model", Retrieved at <<http://goliath.ecnext.com/coms2/gi_0199-6688262/Estimating-the-interdependence-of-television.html>>, Marketing Science, Jul. 1, 2006, pp. 4.

(Continued)

*Primary Examiner* — Nicholas Corbo
(74) *Attorney, Agent, or Firm* — Wolfe-SBMC

(57) ABSTRACT

A computational recommendation engine is described. In embodiment(s), identifiers of ranked programs can be distributed to television client devices, and then a viewing vector from each of the television client devices can be received where the viewing vectors indicate which of the ranked programs have been displayed for viewing at different ones of the television client devices. A client devices group can be created that includes a subset of the television client devices based on the viewing vectors that are received from respective ones of the television client devices. A ranked program can be determined that has not been displayed for viewing by some of the television client devices in the client devices group, and a recommendation of the ranked program can be communicated to the television client devices in the client devices group that have not had the ranked program displayed for viewing.

20 Claims, 4 Drawing Sheets

OTHER PUBLICATIONS

Zimmerman, et al, "TV Personalization System Design of a TV Show Recommender Engine and Interface", Retrieved at <<http://www.cs.cmu.edu/~johnz/pubs/2004_PDT_T&G.pdf>>, pp. 1-29.

Karanth, Aditya "Custom Suggestion Box Component", Retrieved at <<http://sourceforge.net/projects/custmsuggstnbox/>>, Apr. 25, 2004, p. 1.

* cited by examiner

COMPUTATIONAL RECOMMENDATION ENGINE

BACKGROUND

Viewers have an ever-increasing selection of media content to choose from, such as television programming, movies, videos, and music that is available for selection and viewing. Given the large volume of the various types of media content to choose from, viewers may want recommendations for movies and television programs provided to them that not only may be of interest, but recommendations that are useful.

SUMMARY

This summary is provided to introduce simplified concepts of a computational recommendation engine. The simplified concepts are further described below in the Detailed Description. This summary is not intended to identify essential features of the claimed subject matter, nor is it intended for use in determining the scope of the claimed subject matter.

A computational recommendation engine is described. In embodiment(s), identifiers of ranked programs can be distributed to television client devices, and then a viewing vector from each of the television client devices can be received where the viewing vectors indicate which of the ranked programs have been displayed for viewing at different ones of the television client devices. A client devices group can be created that includes a subset of the television client devices based on the viewing vectors that are received from respective ones of the television client devices. A ranked program can be determined that has not been displayed for viewing by some of the television client devices in the client devices group, and a recommendation of the ranked program can be communicated to the television client devices in the client devices group that have not had the ranked program displayed for viewing.

In other embodiment(s) of a computational recommendation engine, the identifiers of the ranked programs that are distributed to the television client devices can be distributed as an ordered list of popular programs. A viewing vector that is then received back from a television client device can be received as a binary digit string where each binary digit corresponds to a ranked program in the ordered list of popular programs. A binary digit value of one indicates that a corresponding ranked program has been displayed for viewing at the television client device, and a binary digit value of zero indicates that the corresponding ranked program has not been displayed for viewing at the television client device.

In other embodiment(s) of a computational recommendation engine, a histogram can be generated based on the viewing vectors that are received from the television client devices. Histogram elements can include the viewing vectors that are the binary digit strings having the same value, a one-bit variance, and/or a two-bit variance. The viewing vectors that are included in a histogram element can be correlated to determine the subset of the television client devices that are included in the client devices group. Additionally, ranked program(s) that is determined for recommendation can be determined from the histogram.

BRIEF DESCRIPTION OF THE DRAWINGS

Embodiments of a computational recommendation engine are described with reference to the following drawings. The same numbers are used throughout the drawings to reference like features and components.

DETAILED DESCRIPTION

Embodiments of a computational recommendation engine provide for reduced-context, television program recommendations based on state information that pertains to whether television client devices have displayed top ranked programs for viewing or not. In addition, the television program recommendations are anonymous, and not based on any user profile data, or program content and metadata. The computational recommendation engine can generate affinity groups of television client devices (e.g., those devices with similar program selection patterns) using integer arithmetic (e.g., addition and Boolean operators). The computational recommendation engine can then generate the program recommendations using the affinity groups to which a television client device is a member and determine programs that have not been displayed for viewing, but which have been displayed for viewing at related television client devices.

While features and concepts of the described systems and methods for computational recommendation engine can be implemented in any number of different environments, systems, and/or various configurations, embodiments of computational recommendation engine are described in the context of the following example systems and environments.

Figure 1:
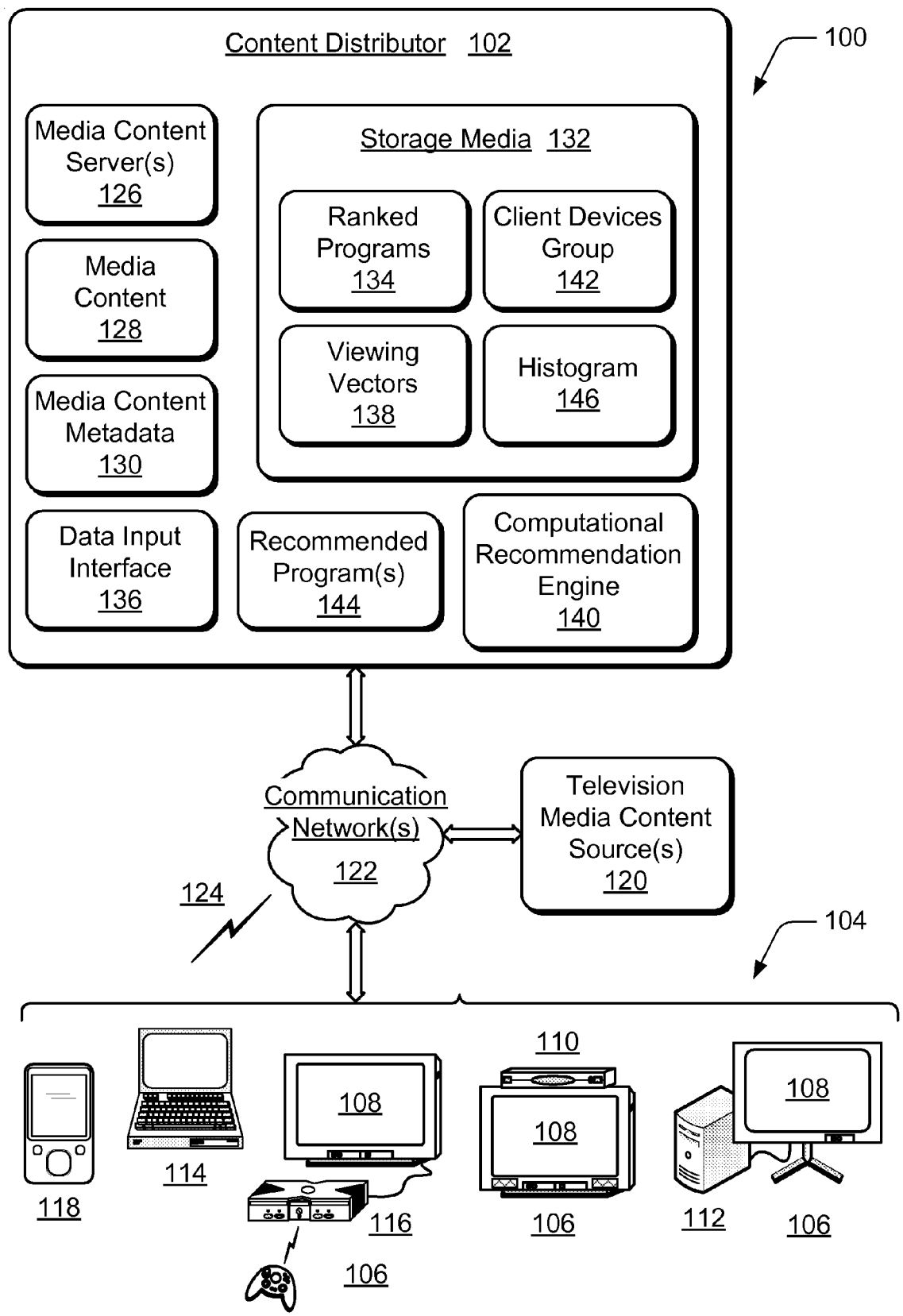
FIG. 1 illustrates an example system in which embodiments of a computational recommendation engine can be implemented.

FIG. 1 illustrates an example system 100 in which various embodiments of a computational recommendation engine can be implemented. Example system 100 includes a content distributor 102 and various television client devices 104 that are implemented to receive television media content from the content distributor 102. The television client devices 104 (e.g., wired and/or wireless client devices) can be implemented as components in various client systems 106. Each of the client systems 106 include a respective television client device and display device 108 that together render or playback any form of audio, video, and/or image content, media content, and/or television content.

A display device 108 can be implemented as any type of a television, high definition television (HDTV), LCD, or similar display system. A television client device in a client system 106 can be implemented as any one or combination of a television client device 110 (e.g., a television set-top box, a digital video recorder (DVR), etc.), a computer device 112, a portable computer device 114, a gaming system 116, a portable media device 118 (e.g., a personal media player, portable media player, etc.), an appliance device, an electronic device, and/or as any other type of client device that can be implemented to receive television media content in any form of audio, video, and/or image data in a media content distribution system.

Any of the television client devices described herein can be implemented with one or more processors, communication components, media content inputs, memory components, signal processing and control circuits, and a media content rendering system. A television client device can also be implemented with any number and combination of differing components as described with reference to the example television client device shown in FIG. 2 and/or the example device shown in FIG. 4. A television client device 104 may also be associated with a user or viewer (i.e., a person) and/or an entity that operates the device such that a client device describes logical devices that include users, software, and/or a combination of devices.

The example system 100 includes content distributor 102 and/or any other television media content source(s) 120 that distribute television media content to the television client devices 104. In a media content distribution system, a television content distributor facilitates distribution of television media content, content metadata, and/or other associated data to multiple viewers, users, customers, subscribers, viewing systems, and/or client devices. Content distributor 102 can receive television media content from various content sources, such as a content provider, an advertiser, a national television distributor, and the like. The content distributor 102 can then communicate or otherwise distribute television media content and/or other media content to any number of the various television client devices. In addition, the content distributor 102 and/or other television media content source (s) 120 can include a proprietary media content distribution system to distribute television media content in a proprietary format.

Media content (e.g., to include recorded media content) can include any type of audio, video, and/or image media content received from any media content source. As described herein, media content can include television media content, television programs (or programming), advertisements, commercials, music, movies, video clips, and on-demand media content. Other media content can include interactive games, network-based applications, and any other content (e.g., to include program guide application data, user interface data, advertising content, closed captions data, content metadata, search results and/or recommendations, and the like).

The television client devices and the sources that distribute media content are implemented for communication via communication network(s) 122 that can include any type of a data network, voice network, broadcast network, an IP-based network, and/or a wireless network 124 that facilitates data and/ or voice communications. The communication network(s) 122 and wireless network 124 can be implemented using any type of network topology and/or communication protocol, and can be represented or otherwise implemented as a combination of two or more networks. Any one or more of the arrowed communication links facilitate two-way data communication, such as from the content distributor 102 to the television client devices 104 and vice-versa.

In this example system 100, content distributor 102 includes media content servers 126 that are implemented to receive media content 128 and/or media content metadata 130 for distribution to subscriber media devices (e.g., the television client devices 104). Content distributor 102 also includes storage media 132 to store or otherwise maintain various data and media content, such as media content 128, media content metadata 130, ranked programs 134, recorded media content, and/or subscriber information.

The media content metadata 130 can include any type of identifying criteria, descriptive information, and/or attributes associated with the media content 128 that describes and/or categorizes the media content. In a Network Digital Video Recording (nDVR) implementation, recorded on-demand assets and media content can be recorded when initially distributed to the various television client devices as scheduled television media content, and stored with the storage media 132 or other suitable storage device. The storage media 132 can be implemented as any type of memory, random access memory (RAM), read only memory (ROM), any type of magnetic or optical disk storage, and/or other suitable electronic data storage.

The ranked programs 134 can include a ranked list of popular programs that is periodically generated, determined, and/or updated at the content distributor. The ranked programs 134 can be distributed from the content distributor 102 to the television client devices 104 as identifiers of the ranked programs. In one example, an updated version of the top ten or twenty programs can be distributed to the television client devices 104 on a daily basis. The television client devices then each generate and/or update a viewing vector that indicates which of the ranked programs have been displayed for viewing at a particular television client device.

In an embodiment, a viewing vector can be implemented as a binary digit string where each binary digit in the string corresponds to a ranked program. For example, an ordered list of "n" programs can be represented as a string of "n" bits, such as a top ten list of ranked programs represented by a string of ten bits. The first ranked program (e.g., the most popular program) in the ranked list corresponds to the $0^{th}$ bit in the bit string, the second ranked program corresponds to the $1^{st}$ bit in the bit string, and so on for bits zero to nine (e.g., in a string of ten bits that each correspond to one of ten ranked programs).

When a ranked program from the list is displayed for viewing at a television client device, the corresponding bit in the string of bits is set to one. A binary digit value of one indicates that a corresponding ranked program has been displayed for viewing at the television client device, and a binary digit value of zero indicates that the corresponding ranked program has not been displayed for viewing at the television client device. In the example of the top ten ranked programs, a television client device can include a viewing vector that has a bit string of "0000000000" which indicates that none of the ranked programs have been displayed for viewing at the television client device. Alternatively, a viewing vector that has a bit string of "1111111111" indicates that all of the ranked programs have been displayed for viewing at the television client device.

The indication of whether a ranked program has been displayed for viewing at a television client device can include parameters to account for a viewer merely browsing or channel surfing. For example, a program can be recognized as having been displayed for viewing if the program is displayed for five minutes, ten minutes, or any other preset and/or customizable time duration. The content distributor 102 includes a data input interface 136 to receive the viewing vectors 138 from each of the television client devices 104, along with an identifier of each respective television client device.

Content distributor 102 includes a computational recommendation engine 140 that can be implemented as computer-executable instructions and executed by processor(s) to implement the various embodiments of a computational recommendation engine as described herein. Although illustrated and described as a component or module of content distributor 102, the computational recommendation engine 140, as well as other functionality to implement the various embodiments described herein, can be provided as a service apart from the content distributor 102 (e.g., on a separate server or by a third party service). In addition, content distributor 102 can be implemented with any number and combination of differing components as further described with reference to the example device shown in FIG. 4.

In various embodiments, the computational recommendation engine 140 can be implemented to create a client devices group 142 that includes a subset of the television client devices 104 based on the viewing vectors 138 that are received from each of the television client devices. The client devices group 142 is an affinity group of the television client devices that have similar viewing vectors (e.g., the television client devices have displayed similar ranked programs for viewing). A single affinity group can be defined by the television client devices 104 that have the same binary digit strings (e.g., identical program-watched bit strings), or by the television client devices 104 that have a binary digit string with a bit variance (e.g., by the metric of bit flips) as correlated with a particular television client device. The computational recommendation engine 140 can also be implemented to determine a ranked program that has not been displayed for viewing by some of the television client devices in the client devices group 142. Recommended program(s) 144 can be communicated as individualized recommendations to the television client devices that have not had ranked program(s) displayed for viewing.

In various embodiments, the computational recommendation engine 140 can generate a histogram 146 based on the viewing vectors 138 that are received from the television client devices 104, and can be indexed based on the binary digit strings that correlate to specific affinity groups. The histogram 146 includes a distribution of the viewing vectors 138 (e.g., that correlate to specific ones of the television client devices 104) into histogram elements, where the correlated television client devices 104 in a histogram element have a similar pattern of displaying the ranked programs 134 for viewing. For example, an affinity group of television client devices can include those devices from which viewing vectors are received with binary digit strings having the same value, a one-bit variance, and/or a two-bit variance.

Several of the television client devices 104 may include viewing vectors with the same binary digit strings of "1111111111" (e.g., in a string of ten bits that each correspond to one of ten ranked programs). Alternatively or in addition, several different television client devices 104 may include viewing vectors with binary digit strings of "1111111011" that are a one-bit variance and/or binary digit strings of "1111010111" that are a two-bit variance. The histogram 146 can be utilized to determine the subset of the television client devices that are included in the client devices group 142 from the viewing vectors that are correlated in an element of the histogram.

The computational recommendation engine 140 can also utilize the histogram 146 to determine the recommended program(s) 144, and generate recommendations using affinity groups to which a given television client device belongs to determine ranked programs that have not been displayed for viewing. In an implementation, the histogram 146 is a global entity that the computational recommendation engine 140 consults when recommended program(s) 144 are determined, and there is an entry for every bit string (e.g., of length "n") in the histogram elements. The computational recommendation engine 140 can evaluate the viewing vectors 138 that are received from the television client devices 104 and identify bit strings that are closely related, as in an affinity group. The computational recommendation engine 140 can measure a mathematical distance between viewing vectors by the bit flips (e.g., the bit variances) as terms of binomial expansion by counting the number of bit flips that would change one bit string to match another. Thus, a television client device will have a distance of zero from itself, and a distance of one from the television client devices that have viewing vectors with bit strings that differ in a single bit position. The computational recommendation engine 140 can count the number of bit strings that are a distance "r" from a given string utilizing a formula for binomial coefficients:

$$C(n, r) = \frac{n!}{(n-r)!r!}$$

For a top ten list of ranked programs where "n" is the number of programs, there are C(10,1)=10 other selections that differ by a one-bit variance (+/−) (e.g., differ by one ranked program having been displayed for viewing, or not), and there are C(10,2)=45 selections that differ by a two-bit variance (e.g., differ by two ranked programs having been displayed for viewing, or not). All of the differences between one and "r" choices is therefore:

$$Q(n, r) = \sum_{k=1}^{r} C(n, k)$$

In a canonical case Q(10,2)=C(10,1)+C(10,2)=(10+45) =55. In this example, this is 5.4% of the total 1024 possibilities, whereas a bit variance of three with ten ranked programs would be C(10,3)=120 and Q(10,3)=175 which is 17% of 1024.

The computational recommendation engine 140 evaluates the viewing vectors 138 as they are received from the television client devices 104 for binary digit strings that have a one-bit variance and/or a two-bit variance in an affinity group. In an embodiment, the bit variances can be computed with a combination of the Boolean exclusive-or operation and bit-counting. For two different viewing vectors having binary digit strings "x" and "y", the distance between them is the number of bits contained in x⊕y, where "⊕" is an exclusive-or operator. Each affinity group can be evaluated to determine if it is a candidate string. If "x" is the binary digit string of a television client device that is being evaluated, then binary digit strings "y" having a one-bit variance are candidates. Mathematically, this can be determined by computing count ((~x&y)&(x⊕y)), where count is the bit-counting operator and "&" is a Boolean AND operator.

For a bit string that is associated with a specific television client device (i.e., the device for which a recommendation is to be generated), candidate strings are those that satisfy two constraints: a) "close" in terms of bit flips to the viewing device bit string (affinity); b) having at least one bit set (program watched) that was clear in the viewing device bit string. The number of such programs for a given candidate string is the value computed by count((~x^y)&(x xor y)), and the identity of the programs is given by the specific bit positions indicated by (~x^y)&(x xor y). For each of the television client devices 104, there may be multiple candidate bit strings, each of which can indicate program(s) that could be recommended (e.g., by the binary digit values). In an implementation, a function of the histogram 146 is to weight each candidate string by how many television client devices 104 share a particular pattern of ranked programs preferences. For example, the list of candidate strings "y" can be sorted by hist[y] (where "y" is used to index into the histogram), and then the recommendations are determined from traversing the sorted list and extracting the programs indicated by "(~x^y) &(x xor y)" from each element "y" in succession.

After candidate bit strings are selected from the fifty-five possibilities (e.g., based on the one-bit and two-bit variances), these are sorted according to their population into a list or an array. The candidate bit strings at the top of the list represent the most popular affinity group binary digit strings related to "x", and each contains at least one ranked program that has not been displayed for viewing by the television client device. Some or all of the binary digit strings can then be extracted, merged together (e.g., via a logical-OR), and returned to the television client device as a recommendation.

The computational recommendation engine 140 can also implement algorithm analysis, where the algorithm is O(n) on the number of television client devices, and $O(2^n)$ on both the size of the top "n" list of ranked programs and on the binary digit string distance. For n=10, the count function can be implemented as a 1024-element lookup table, and there are direct combinatorial methods for determining the proximate binary digit strings.

Figure 2:
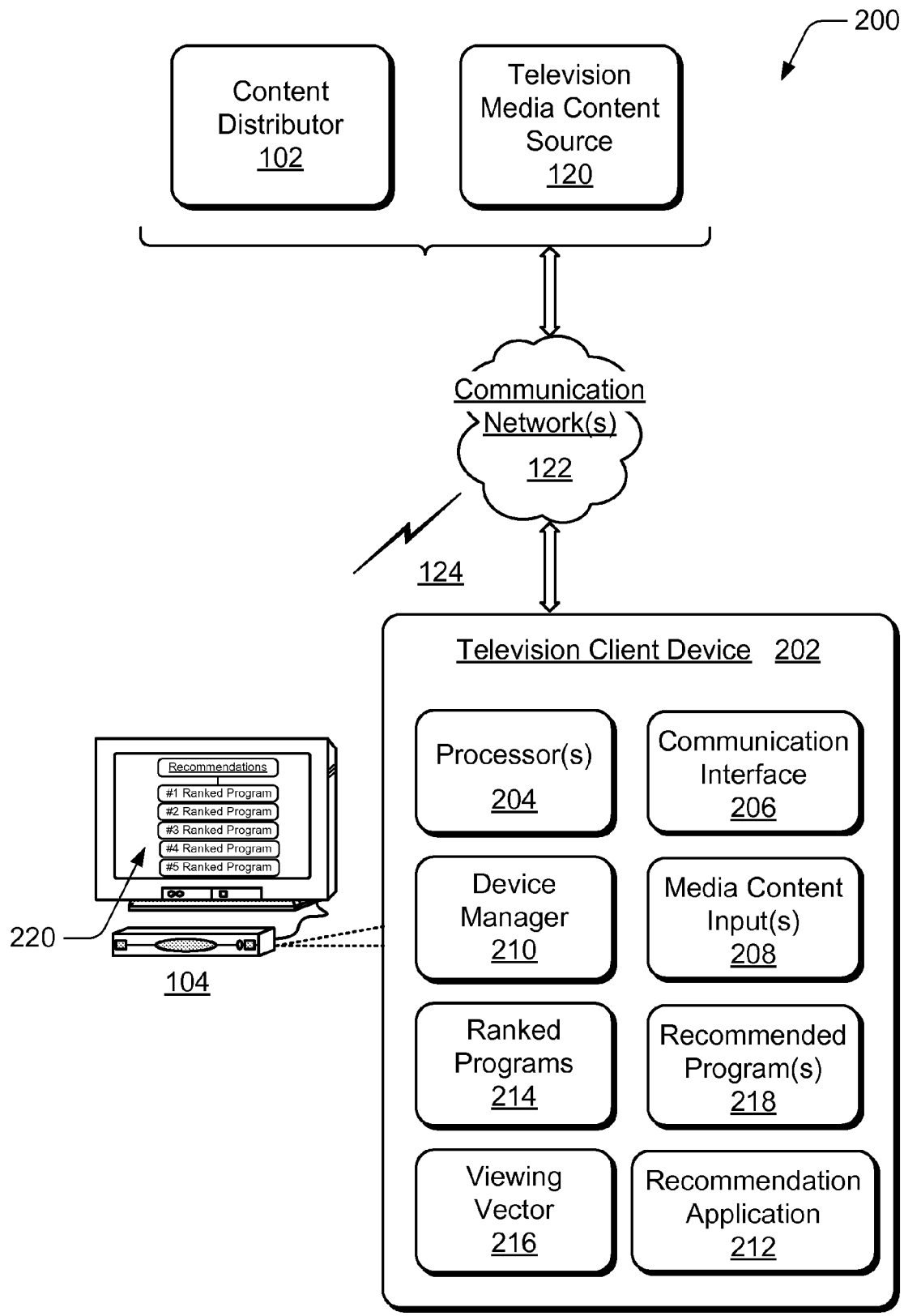
FIG. 2 illustrates another example system in which embodiments of a computational recommendation engine can be implemented.

FIG. 2 illustrates another example system 200 in which various embodiments of a computational recommendation engine can be implemented. Example system 200 includes the content distributor 102, television media content source 120, and a television client device 202 that are all implemented for communication via the communication network(s) 122 and/or the wireless network 124. Examples and implementations of the content distributor 102 are described with reference to FIG. 1. Television client device 202 is an example of the various television client devices 104 described with reference to FIG. 1.

In this example system 200, television client device 202 includes one or more processors 204 (e.g., any of microprocessors, controllers, and the like), a communication interface 206 for data communications, and/or media content input(s) 208 to receive television media content. Television client device 202 also includes a device manager 210 (e.g., a control application, software application, signal processing and control module, code that is native to a particular device, a hardware abstraction layer for a particular device, etc.).

Television client device 202 also includes a recommendation application 212 that can be implemented as computer-executable instructions and executed by the processors 204 to implement various embodiments and/or features of a computational recommendation engine. In an embodiment, the recommendation application 212 can be implemented as a component or module of the device manager 210. The television client device 202 can receive ranked programs 214 from the content distributor 102. The recommendation application 212 can then generate and/or update the viewing vector 216 for television client device 202 which is then communicated back to the content distributor 102. The television client device 202 can then receive the recommended program(s) 218 from the television content distributor 102. These features of receiving ranked programs 214, updating and communicating the viewing vector 216 to the content distributor 102, and receiving the recommended program(s) 218 are all described with reference to FIG. 1.

The recommendation application 212 can also be implemented at the television client device 202 to initiate a display 220 of the recommended program(s) 218 for viewer selection. In an embodiment, the recommended program(s) 218 can be an individualized list of the ranked and/or popular programs that have not been displayed for viewing at the television client device 202. A viewer can then select the recommended program(s) 218 for viewing.

Example method 300 is described with reference to FIG. 3 in accordance with one or more embodiments of a computational recommendation engine. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. Example method 300 may be described in the general context of computer-executable instructions, which can include software, applications, routines, programs, objects, components, data structures, procedures, modules, functions, and the like.

The method(s) may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
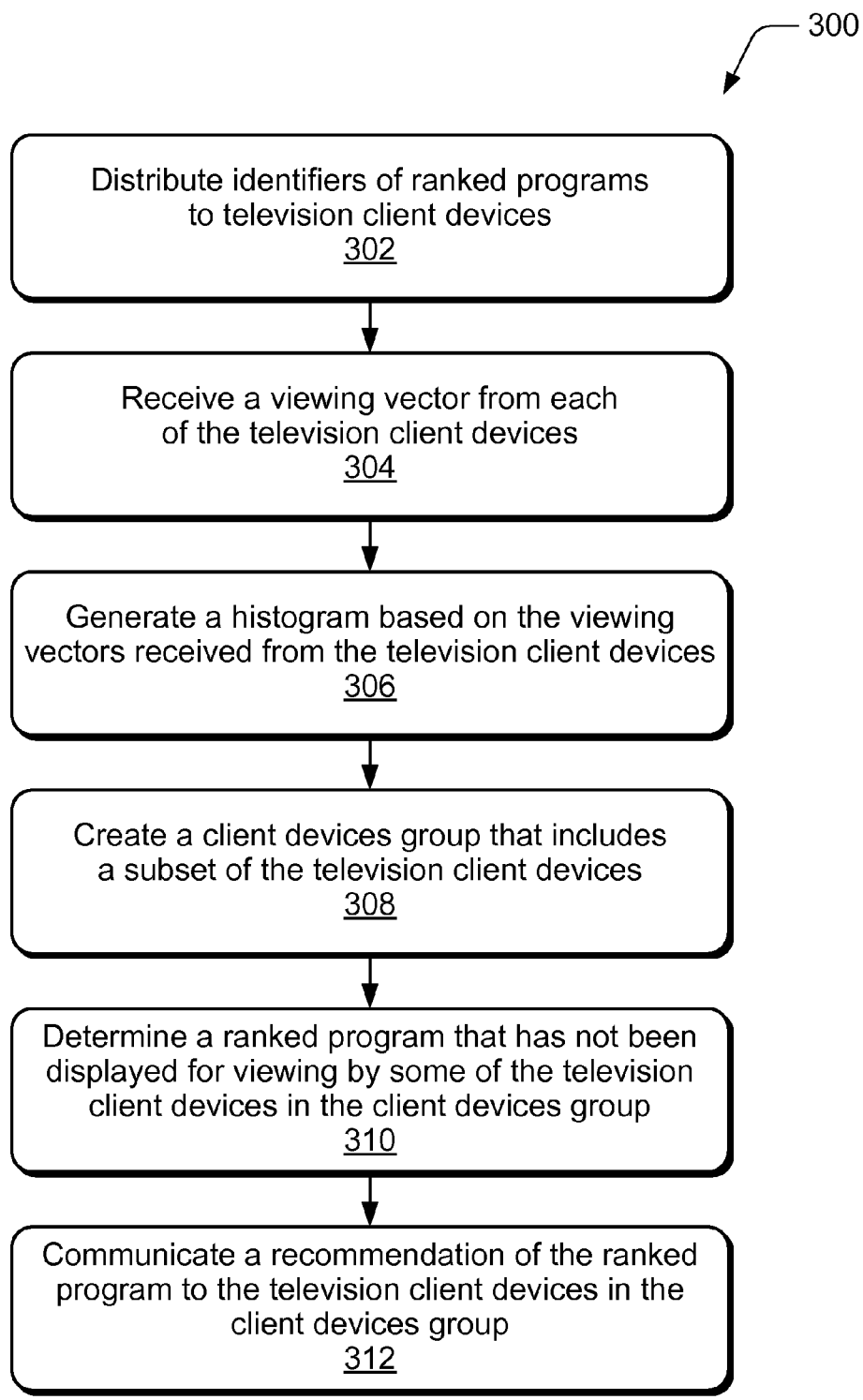
FIG. 3 illustrates example method(s) for a computational recommendation engine in accordance with one or more embodiments.

FIG. 3 illustrates example method(s) 300 of a computational recommendation engine. The order in which the method is described is not intended to be construed as a limitation, and any number of the described method blocks can be combined in any order to implement the method, or an alternate method.

At block 302, identifiers of ranked programs are distributed to television client devices. For example, content distributor 102 (FIG. 1) distributes ranked programs 134 to the television client devices 104, such as identifiers of the top ten or twenty popular programs that are being tuned or requested for viewing. The identifiers of the ranked programs 134 can also be distributed to the television client devices 104 as an ordered list of popular programs.

At block 304, a viewing vector is received from each of the television client devices. For example, content distributor 102 receives viewing vectors 138 from each of the different television client devices 104, and the viewing vectors 138 indicate which of the ranked programs have been displayed for viewing at different ones of the television client devices. A viewing vector 138 can be received from a television client device 104 as a binary digit string where each binary digit corresponds to a ranked program in an ordered list of popular programs. A binary digit value of one in a binary digit string indicates that a corresponding ranked program in the ordered list of popular programs has been displayed for viewing at the television client device, and a binary digit value of zero in the binary digit string indicates that the corresponding ranked program in the ordered list of popular programs has not been displayed for viewing at the television client device.

At block 306, a histogram is generated based on the viewing vectors that are received from the television client devices. For example, the computational recommendation engine 140 at content distributor 102 generates the histogram 146 based on the binary digit strings that are received as the viewing vectors 138 from respective ones of the television client devices 104.

At block 308, a client devices group is created that includes a subset of the television client devices based on the viewing vectors that are received from the television client devices. For example, the computational recommendation engine 140 creates the client devices group 142 that includes television client devices 104 correlated based on the viewing vectors that are received from the television client devices. In an embodiment, viewing vectors that are included in a histogram element are utilized to determine the subset of the television client devices that are included in the client devices group 142. The histogram element can include the viewing vectors that are the binary digit strings having the same value, a one-bit variance, and/or a two-bit variance.

At block 310, a ranked program is determined that has not been displayed for viewing by some of the television client devices in the client devices group and, at block 312, a recommendation of the ranked program is communicated to the television client devices in the client devices group. For example, the computational recommendation engine 140 determines a ranked program that has not been displayed for viewing at some of the television client devices 104 in the client devices group 142, and then communicates the determined program as a recommendation to the television client devices. In an embodiment, the recommended program can be determined from the histogram 146.

Figure 4:
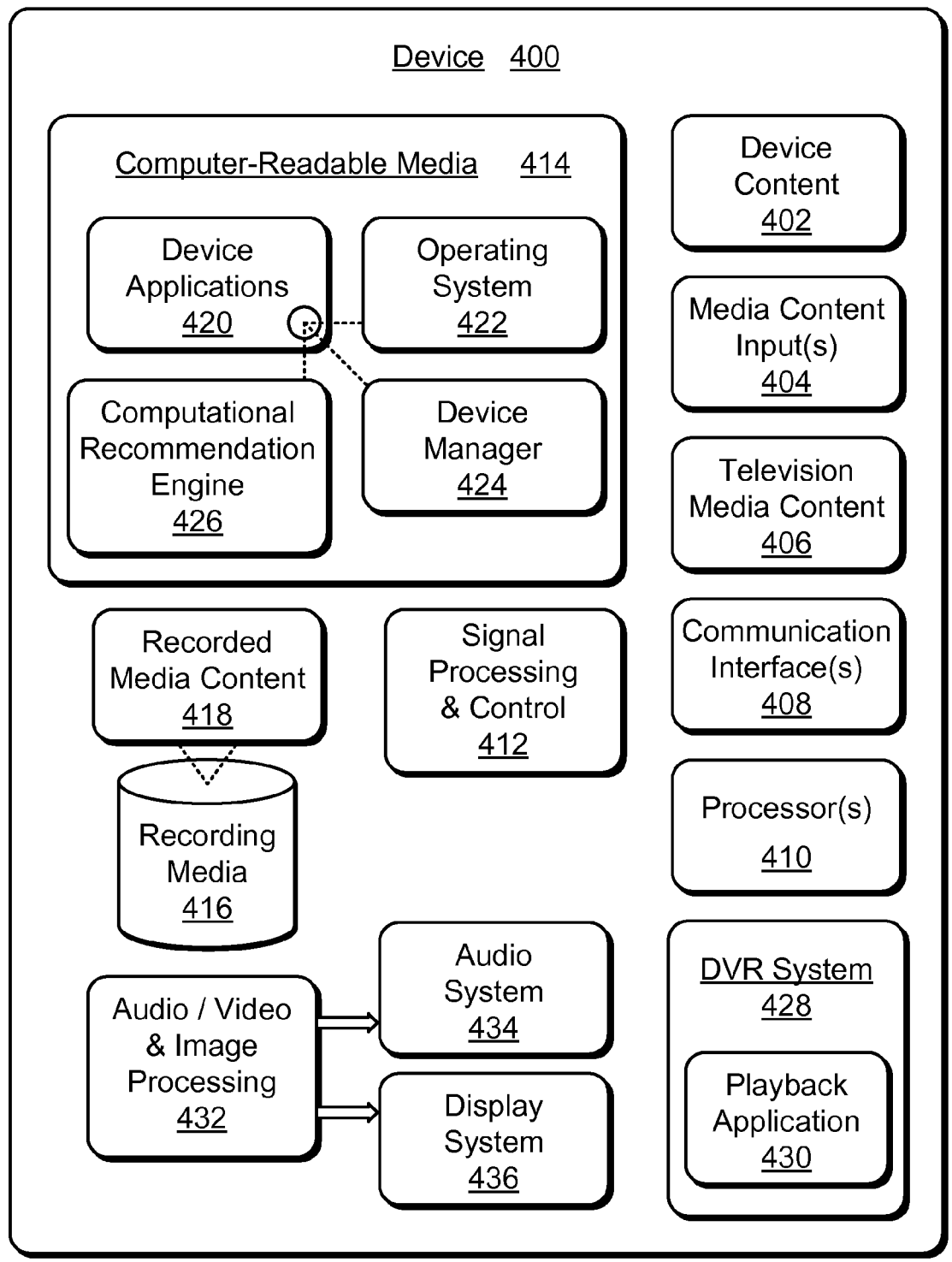
FIG. 4 illustrates various components of an example device that can implement embodiments of a computational recommendation engine.

FIG. 4 illustrates various components of an example device 400 that can be implemented as any form of a television client device (e.g., a television set-top box, a digital video recorder (DVR), etc.), computing, electronic, appliance, and/or media device to implement various embodiments of a computational recommendation engine. For example, device 400 can be implemented as a television client device as shown in FIG. 1 and/or FIG. 2. Alternatively, device 400 can be implemented as a content distributor as described with reference to FIG. 1.

Device 400 can include device content 402, such as configuration settings of the device, media content stored on the device, and/or information associated with a user of the device. Media content stored on device 400 can include any type of data as well as audio, video, and/or image media content. Device 400 can include one or more media content inputs 404 via which television media content 406 can be received. In an embodiment, the media content inputs 404 can include Internet Protocol (IP) inputs over which streams of media content are received via an IP-based network. In other embodiments, the media content inputs 404 can include proprietary network inputs to receive television media content from a network server.

Device 400 further includes one or more communication interfaces 408 that can be implemented as any one or more of a serial and/or parallel interface, a wireless interface, any type of network interface, a modem, and as any other type of communication interface. The communication interfaces 408 provide a connection and/or communication links between device 400 and a communication network by which other electronic, computing, and communication devices can communicate data with device 400.

Device 400 can include one or more processors 410 (e.g., any of microprocessors, controllers, and the like) which process various computer-executable instructions to control the operation of device 400 and to implement embodiments of a computational recommendation engine. Alternatively or in addition, device 400 can be implemented with any one or combination of hardware, firmware, or fixed logic circuitry that is implemented in connection with signal processing and control circuits which are generally identified at 412.

Device 400 can also include computer-readable media 414, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like. Device 400 may also include a recording media 416 to maintain recorded media content 418 that device 400 receives and/or records.

Computer-readable media 414 provides data storage mechanisms to store the device content 402, as well as various device applications 420 and any other types of information and/or data related to operational aspects of device 400. For example, an operating system 422 can be maintained as a computer application with the computer-readable media 414 and executed on the processors 410. The device applications 420 can also include a device manager 424 (e.g., when device 400 is implemented as a television client device) and a computational recommendation engine 426 (e.g., when device 400 is implemented as a content distributor). In this example, the device applications 420 are shown as software modules and/or computer applications that can implement various embodiments of a computational recommendation engine When implemented as a television client device, the device 400 can also include a DVR system 428 with a playback application 430 that can be implemented as a media control application to control the playback of recorded media content 418 and/or any other audio, video, and/or image media content that can be rendered and/or displayed for viewing. The recording media 416 can maintain recorded media content that may include the television media content 406 when it is received from a content distributor and recorded. For example, the television media content 406 can be recorded when received as a viewer-scheduled recording, or when the recording media 416 is implemented as a pause buffer that records the streaming media content 406 as it is being received and rendered for viewing.

Device 400 can also include an audio, video, and/or image processing system 432 that provides audio data to an audio rendering system 434 and/or provides video or image data to a display system 436. The audio rendering system 434 and/or the display system 436 can include any devices or components that process, display, and/or otherwise render audio, video, and image data. The audio rendering system 434 and/or the display system 436 can be implemented as integrated components of the example device 400. Alternatively, audio rendering system 434 and/or the display system 436 can be implemented as external components to device 400. Video signals and audio signals can be communicated from device 400 to an audio device and/or to a display device via an RF (radio frequency) link, S-video link, composite video link, component video link, DVI (digital video interface), analog audio connection, or other similar communication link.

Although not shown, device 400 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Although embodiments of a computational recommendation engine have been described in language specific to features and/or methods, it is to be understood that the subject of the appended claims is not necessarily limited to the specific features or methods described. Rather, the specific features and methods are disclosed as example implementations of a computational recommendation engine.

The invention claimed is:

1. A method, comprising:
   distributing identifiers of ranked programs to television client devices;
   receiving a viewing vector as a binary digit string from each of the television client devices, the viewing vectors indicating which of the ranked programs have been displayed for viewing at different ones of the television client devices;

measuring variances between the viewing vectors to identify one or more of the binary digit strings that represent a subset of the television client devices with similar viewing vectors, the variances between the viewing vectors being measured by at least counting a number of binary digit flips that would change one binary digit string to match another binary digit string;

creating a client devices group that includes the subset of the television client devices based on the viewing vectors that are received from respective ones of the television client devices;

determining a ranked program that has not been displayed for viewing by some of the television client devices in the client devices group; and communicating a recommendation of the ranked program to the television client devices in the client devices group that have not had the ranked program displayed for viewing.

2. A method as recited in claim 1, further comprising generating a histogram based on the viewing vectors that are received from respective ones of the television client devices, and wherein the ranked program that is determined for recommendation is determined from the histogram.

3. A method as recited in claim 1, wherein:
the identifiers of the ranked programs are distributed as an ordered list of popular programs; and
each binary digit in the binary digit string of the viewing vector corresponds to a single ranked program in the ordered list of popular programs.

4. A method as recited in claim 1, further comprising generating a histogram based on the binary digit strings that are received as the viewing vectors from respective ones of the television client devices, a histogram element including the viewing vectors that are the binary digit strings having at least one of a same value, a one-bit variance, or a two-bit variance.

5. A method as recited in claim 4, further comprising correlating the viewing vectors that are included in the histogram element to determine the subset of the television client devices that are included in the client devices group.

6. A method as recited in claim 3, wherein a binary digit value of one indicates that a corresponding ranked program in the ordered list of popular programs has been displayed for viewing at the television client device, and wherein a binary digit value of zero indicates that the corresponding ranked program in the ordered list of popular programs has not been displayed for viewing at the television client device.

7. A method as recited in claim 6, wherein the client devices group includes the subset of the television client devices from which viewing vectors are received that are binary digit strings with a one-bit variance.

8. A method as recited in claim 6, wherein the client devices group includes the subset of the television client devices from which viewing vectors are received that are binary digit strings with a two-bit variance.

9. A content distributor, comprising:
an interface configured to receive viewing vectors from television client devices, a viewing vector indicating which ranked programs have been displayed for viewing at a television client device, the viewing vector including a binary digit string where each binary digit corresponds to a single ranked program;
at least a memory and a processor to implement a computational recommendation engine that is configured to:
identify one or more of the binary digit strings that represent a subset of the television client devices with similar viewing vectors by at least measuring bit variances between the viewing vectors, the bit variances between the viewing vectors being measured by at least counting a number of binary digit flips that would change one binary digit string to match another binary digit string;
create one or more client devices groups based on the viewing vectors that are received from respective ones of the television client devices, a client devices group including the subset of the television client devices;
determine which of the one or more client devices groups represent candidate strings that are similar to the viewing vector of the television client device and indicate at least one program recommendation;
determine one or more ranked programs that have not been displayed for viewing by some of the television client devices in the client devices group by at least traversing a sorted list of the candidate strings and extracting the one or more ranked programs;
merge the extracted ranked programs into a recommended program list; and
send the recommended program list to the television client devices in the client devices group that have not had the extracted ranked programs displayed for viewing.

10. A content distributor as recited in claim 9, wherein the computational recommendation engine is further configured to generate a histogram based on the viewing vectors that are received from respective ones of the television client devices, and determine the one or more ranked programs for recommendation from the histogram.

11. A content distributor as recited in claim 10, wherein a histogram element of the histogram includes the viewing vectors that are the binary digit strings having at least one of a same value, a one-bit variance, or a two-bit variance.

12. A content distributor as recited in claim 11, wherein the computational recommendation engine is further configured to correlate the viewing vectors that are included in the histogram element to determine the subset of the television client devices that are included in the client devices group.

13. A content distributor as recited in claim 9, wherein a binary digit value of one indicates that a corresponding ranked program has been displayed for viewing at the television client device, and a binary digit value of zero indicates that the corresponding ranked program has not been displayed for viewing at the television client device.

14. A content distributor as recited in claim 9, wherein the client devices group includes the subset of the television client devices from which viewing vectors are received that are binary digit strings with a one-bit variance.

15. A content distributor as recited in claim 9, wherein the client devices group includes the subset of the television client devices from which viewing vectors are received that are binary digit strings with a two-bit variance.

16. One or more computer-readable storage media devices comprising computer-executable instructions that, when executed, initiate a computational recommendation engine to:
receive viewing vectors from television client devices, a viewing vector indicating which ranked programs have been displayed for viewing at a television client device, the viewing vector including a binary digit string where each binary digit corresponds to a single ranked program;
calculate mathematical distances between the viewing vectors by at least counting a number of binary digit flips that would change one binary digit string to match another binary digit string;
identify, based on the mathematical distances between the viewing vectors, one or more of the binary digit strings that represent a subset of the television client devices with similar binary digit strings;

create a client devices group that includes the subset of the television client devices based on the viewing vectors that are received from respective ones of the television client devices; and determine a ranked program that has not been displayed for viewing by some of the television client devices in the client devices group.

17. One or more computer-readable storage media devices as recited in claim 16, further comprising computer-executable instructions that, when executed, initiate the computational recommendation engine to generate a histogram based on the viewing vectors that are received from the respective ones of the television client devices.

18. One or more computer-readable storage media devices as recited in claim 17, further comprising computer-executable instructions that, when executed, initiate the computational recommendation engine to determine the ranked program that has not been displayed for viewing by some of the television client devices from the histogram.

19. One or more computer-readable storage media devices as recited in claim 17, further comprising computer-executable instructions that, when executed, initiate the computational recommendation engine to correlate the viewing vectors that are included in the histogram to determine the subset of the television client devices that are included in the client devices group, wherein a binary digit value of one in a viewing vector corresponds to a ranked program that has been displayed for viewing at the television client device, and a binary digit value of zero in the viewing vector corresponds to the ranked program that has not been displayed for viewing at the television client device.

20. One or more computer-readable storage media devices as recited in claim 19, further comprising computer-executable instructions that, when executed, initiate the computational recommendation engine to further correlate the viewing vectors based on the binary digit strings having at least one of a same value, a one-bit variance, or a two-bit variance.

* * * * *